US012749243B2

(12) United States Patent
Grünwald

(10) Patent No.: US 12,749,243 B2
(45) Date of Patent: Sep. 29, 2026

(54) IMAGE RECONSTRUCTION WITH EXTRAPOLATION

(71) Applicant: Siemens Healthineers AG, Forchheim (DE)

(72) Inventor: Oxana Grünwald, Hemhofen (DE)

(73) Assignee: Siemens Healthineers AG, Forchheim (DE)

( * ) Notice: Subject to any disclaimer, the term of this patent is extended or adjusted under 35 U.S.C. 154(b) by 224 days.

(21) Appl. No.: 18/805,846

(22) Filed: Aug. 15, 2024

(65) Prior Publication Data

US 2025/0061619 A1 Feb. 20, 2025

(30) Foreign Application Priority Data

Aug. 15, 2023 (DE) ..................... 10 2023 207 831.7

(51) Int. Cl.
*G06T 12/10* (2026.01)

(52) U.S. Cl.
CPC ........ *G06T 12/10* (2026.01); *G06T 2211/432* (2013.01)

(58) Field of Classification Search
CPC ... G06T 12/10; G06T 2211/432; G06T 12/00; G06T 12/20; A61B 6/5205; A61B 6/4441; A61B 8/5207; A61B 6/03; G01N 2223/401; G01N 23/04
See application file for complete search history.

(56) References Cited

U.S. PATENT DOCUMENTS 6,307,909 B1 * 10/2001 Flohr ...................... G06T 12/10 378/4
6,810,102 B2 10/2004 Hsieh
2009/0122955 A1 5/2009 Bruder
2019/0164317 A1 * 5/2019 Tang ...................... A61B 6/032

FOREIGN PATENT DOCUMENTS

DE 19854917 A1 6/2000
DE 102007054079 A1 5/2009

OTHER PUBLICATIONS

Dennerlein, Frank, and Andreas Maier. "Region-of-interest reconstruction on medical C-arms with the ATRACT algorithm." Medical Imaging 2012: Physics of Medical Imaging. vol. 8313. SPIE, 2012. pp. 1-9.

(Continued)

*Primary Examiner* — Chan S Park
*Assistant Examiner* — Daniel C Chang
(74) *Attorney, Agent, or Firm* — Lempia Summerfield Katz LLC

(57) ABSTRACT

Artifacts in the reconstruction of images are to be reduced. For this purpose, a method in which a line signal of an object is captured with an imaging modality is provided. The line signal represents a truncated projection through a portion of the object. The line signal is extrapolated with a profile function that represents a cross-sectional profile of the object. For the extrapolation, three points into which the profile function is placed, such as the two end points of the line signal and a third point having a line index that corresponds to the line index of a maximum of the line signal, are selected.

19 Claims, 3 Drawing Sheets

(56) References Cited

OTHER PUBLICATIONS

Kolditz, Daniel, Yiannis Kyriakou, and Willi A. Kalender. "Volume-of-interest (VOI) imaging in C-arm flat-detector CT for high image quality at reduced dose." Medical physics 37.6Part1 (2010): 2719-2730.

Maier, Andreas, Bernhard Scholz, and F. Dennerlein. "Optimization-based extrapolation for truncation correction." 2nd CT Meeting. 2012. pp. 1-5.

Maltz, Jonathan S., et al. "CT truncation artifact removal using water-equivalent thicknesses derived from truncated projection data." 2007 29th annual international conference of the IEEE engineering in medicine and biology society. IEEE, 2007. pp. 2907-2911.

Ohnesorge, B., et al. "Efficient correction for CT image artifacts caused by objects extending outside the scan field of view." Medical physics 27.1 (2000): 39-46.

Starman, Jared, et al. "Estimating 0th and 1st moments in C-arm CT data for extrapolating truncated projections." Medical Imaging 2005: Image Processing. vol. 5747. SPIE, 2005. pp. 378-387.

Xia, Y., et al. "Patient-bounded extrapolation using low-dose priors for vol. of-interest imaging in C-arm CT." Medical physics 42.4 (2015): 1787-1796.

Xia, Yan, et al. "Efficient 2D filtering for cone-beam VOI reconstruction." 2012 IEEE Nuclear Science Symposium and Medical Imaging Conference Record (NSS/MIC). IEEE, 2012. pp. 1-6.

Xia, Yan, et al. "Reconstruction from truncated projections in cone-beam CT using an efficient 1D filtering." Medical Imaging 2013: Physics of Medical Imaging. vol. 8668. SPIE, 2013. pp. 1-7.

Xia, Yan, et al. "Truncation Correction using a 3D Filter for Cone-beam CT." Fully3D, Ed., Fully3D 2013 (2013): 118-121.

Zellerhoff, M., et al. "Low contrast 3D reconstruction from C-arm data." Medical Imaging 2005: Physics of Medical Imaging. vol. 5745. SPIE, 2005. pp. 646-655.

* cited by examiner

IMAGE RECONSTRUCTION WITH EXTRAPOLATION

This application claims the benefit of German Patent Application No. DE 10 2023 207 831.7, filed on Aug. 15, 2023, which is hereby incorporated by reference in its entirety.

BACKGROUND

The present embodiments relate to a method for reconstructing an image of an object, and a corresponding imaging modality for reconstructing the image of the object.

The main aim of interventional C-arm X-ray systems is two-dimensional (2D) live imaging during catheter interventions. Almost 20 years ago, CT-like soft-tissue imaging (e.g., cone beam CT: CBCT) was introduced on these systems. Since then, although the quality of 3D images has improved considerably, problems still arise because the angiographic C-arm systems are optimized for 2D live imaging during interventions.

One challenge is the limited detector size of angiographic systems. Some body regions, such as the thorax, abdomen, and hips, cannot be mapped in their entirety on the detector. This results in projection images that are cut off or truncated. The reconstructed volume has strong bright artifacts along its borders, since, in the truncated region, the truncated projection images have a signal strength of zero, for example. Compared to conventional CT, the truncation artifacts are stronger in interventional CBCT images because the field of view is much smaller. In addition, it is often necessary to focus on the organ of interest (e.g., the liver or one of the lungs). This causes strong asymmetric truncation with respect to the longitudinal axis of the body.

Over past decades, various methods for truncation correction have been proposed. Most of these methods are aimed at conventional computed tomography (CT) imaging, where truncation is rarely severe and mainly symmetric. Many of these approaches are based on the extrapolation of truncated projection data. In cases in which truncation is not severe, methods such as symmetric mirroring may be effective (Efficient correction for CT image artifacts caused by objects extending outside the scan field of view, B. Ohnesorge, T. Flohr, K. Schwarz, Medical Physics 27 (1), January 2000).

Another well-known extrapolation method is the fitting of a water cylinder to the truncated projection data, which has also been fitted for C-arm CBCT (Low contrast 3D reconstruction from C-arm data, M. Zellerhof, B. Scholz, E.-P. Rührnschopf, T. Brunner, Medical Imaging 2005: Physics of Medical Imaging, Proc. of SPIE Vol. 5745).

Several methods use 0th (zeroth) moments of the projection data; some also use 1st (first) moments of the projection data. Strictly speaking, preserving these moments is a valid assumption for parallel beam geometry, but this requires computationally intensive rebinning methods or possibly iterative methods for fan and cone beam geometries. Depending on the existence of non-truncated projections in the scan, the extrapolation length of initial water cylinder extrapolation may be fitted using the 0th moments (U.S. Pat. No. 6,810,102 B2), or 0th and 1st moments may be used for extrapolation with, for example, a cosine function (DE 10 2007 054 079 A1). If all projections are truncated, ellipses may be fitted to the projection data, and the preservation of the 0th and 1st moments may be used as a condition for this first extrapolation (Estimating 0th and 1st moments in C-arm CT data for extrapolating truncated projections, J. Starman, N. Pelc, N. Strobel, R. Fahrig, Medical Imaging 2005: Image Processing, Proc. of SPIE Vol. 5747). Exact fitting of an ellipse to thorax projections may be adversely affected by the low attenuation coefficient of the lung compared to the rest of the body.

The approximated truncation robust algorithm for computed tomography (ATRACT) offers a modified filtering approach that is more robust against truncation artifacts (Efficient 2D filtering for cone-beam VOI reconstruction, Y. Xia, A. Maier, F. Dennerlein, H. G. Hofmann, J. Hornegger, 2012 IEEE Nuclear Science Symposium and Medical Imaging Conference, pp. 2415-2420). The standard ramp filter is decomposed into a local Laplacian operator step and a non-local 2D Radon-based filtering step. In this method, the reconstructed data is affected by a Hounsfield (HU) offset that is to be estimated and corrected using a separate method.

SUMMARY AND DESCRIPTION

The scope of the present invention is defined solely by the appended claims and is not affected to any degree by the statements within this summary.

The present embodiments may obviate one or more of the drawbacks or limitations in the related art. For example, artifacts that arise on the reconstruction of an image with truncated mapping are reduced.

Accordingly, according to the present embodiments, a method for reconstructing an image of an object is provided. An image may be reconstructed from raw signals of an imaging modality. A corresponding reconstruction algorithm may generate a reconstructed image from such raw signals. This may be an image of an object (e.g., a human body). However, the object may also be an animal body, a plant, or a technical object.

In a first act, a line signal of the object is captured with an imaging modality, where the line signal represents a truncated projection through a portion of the object. For example, the imaging modality is an X-ray facility with a 2D detector. Such a detector is able to capture a line corresponding to a one-dimensional (1D) projection. Hence, the line signal represents a projection of a cross section through the object and, for example, the projection through a thin cross section (e.g., a thin layer) of the object. However, the imaging modality may also be other apparatuses that are not based on X-ray technology. For example, the imaging modality may also be based on sonography. In the case of an X-ray imaging modality, this may be a C-arm system, a CT system, a CBCT system, an angiographic system, or the like.

The projection does not, for example, represent the entire cross section through the object, but only a portion of the object that is limited on one or both sides (e.g., truncated or cut off). This may, for example, be the case if the object is much larger than the detector of the imaging modality. As mentioned in the introduction, this is often the case when an angiographic system is used to examine larger regions of the body, such as the thorax. For example, if a detector is only 30×40 cm in size, it is often only possible to depict part of a cross section of a human body. For example, the cross section or the corresponding line signal is generally cropped laterally. For example, therefore, the line signal may only represent part of a cross section perpendicular to the spine of a body to be examined.

In a further act, the line signal is extrapolated. Since the line signal is truncated on one or both sides, accordingly, one or two extrapolations may be carried out at the truncated points. Extrapolation causes the line signal to be expanded artificially in the respective direction.

The image is reconstructed with the aid of the extrapolated line signal. For example, it is not only the line signal that is actually captured that is entered into a corresponding reconstruction algorithm, but also the corresponding extrapolated line signal. This enables it to be provided that the line signal does not drop abruptly to zero signal strength at the edge. This has the advantage that the reconstructed image shows fewer artifacts than without extrapolation. For example, this enables strong increases in the gray values at the edges of the image to be avoided.

According to the present embodiments, extrapolation is carried out with a profile function that represents an approximation of a cross-sectional profile of the object. The projection profile of the object to be examined may be approximated with a profile function. If, for example, a patient is lying on an X-ray table, the projection cross section may be approximated by a semi-ellipse. Therefore, in this case, the profile function is a semi-ellipse. The situation is similar if, for example, a patient's skull is to be examined. However, if an object with a roughly triangular cross section is examined, the projection function may also be triangular, so that a triangular function may be selected as the profile function. This applies analogously to other technical objects.

For the extrapolation, three points are selected into which the profile function is placed: a) a first point at a first end of the line signal; b) a second point at a second end of the line signal opposite the first end or corresponding to an end of the cross-sectional profile of the object; and c) a third point having a line index that corresponds with the line index of a maximum of the line signal.

Therefore, at least three points on the profile function are used to realize the extrapolation. The first point and the second point simply result from the two ends of the line signal. Hence, the first point and the last point of the line signal are used for the extrapolation. Alternatively, the second point may also correspond to an end of the cross-sectional profile of the object. This is the case if the truncation is only one-sided and the profile function is accordingly placed through the end of the cross-section projection (e.g., where signal strength is zero). The third point is located at a maximum of the line signal. The maximum is a point that is at the greatest distance to a reference line. The reference line may, for example, be the line with zero signal strength. In this case, the maximum is located at the point that has the absolute highest signal strength (e.g., strongest absorption). However, as will be demonstrated below, the reference line may also be defined by the first point and the second point. The line signal corresponds to a linear sequence of individual measurement signals that have an ascending or descending line index one after the other. Therefore, a third point having a line index that corresponds to that of the maximum is selected. For example, the line index represents the X value in an XY coordinate system. Hence, the line index defines at least one coordinate (e.g., the X coordinate of the third point). The Y coordinate may be determined according to further criteria. For example, the Y coordinate may actually correspond to the absolute signal maximum. However, the Y coordinate may also, for example, be formed from other signal values of the line signal.

In one embodiment, the three points enable the profile function to be uniquely defined locally so that a realistic extrapolation may take place. For example, a concave semi-ellipse is placed into the three points as a profile function. Since the line signal is continued by the extrapolation without a jump at the edge, artifacts may be avoided or reduced when reconstructing the corresponding image.

In an example embodiment, the imaging modality has an X-ray facility, an MRI facility, or a sonography facility. These imaging modalities may use a matrix sensor capable of supplying a corresponding line signal. These line signals may be extrapolated by the above method, resulting in improved reconstruction of an image.

For example, the X-ray facility may be a C-arm system or angiography system. The often smaller detectors used in this case lead to the truncation problems mentioned in the introduction and may hence benefit from the reconstruction method according to the present embodiments.

In one example embodiment of the method according to the present embodiments, the profile function is an ellipse. An ellipse is, for example, advantageous if the object to be examined is, for example, part of a human body. With a very large detector, the radiation is not attenuated at the edge of the body, and thus, accordingly truncated line signals may be extrapolated by an ellipse with a small detector.

According to one development, half of the ellipse is used for the profile function. Thus, the profile function represents a concave semi-ellipse. Such a semi-elliptical shape may result in the actual projection curve for the thorax region or the hip region of a human body. The other half of the ellipse may be irrelevant for the extrapolation.

In one example embodiment, a main axis of the ellipse (e.g., (semi-ellipse) matches a baseline of the line signal. The baseline corresponds to the line with zero signal strength. The main axis of the ellipse is aligned with this baseline, under the assumption that, with uniform radiation in the body, the line signal may represent a semi-ellipse.

In a further example embodiment, it is provided that a signal value that is formed as a statistical value from signal values in a specified lateral region around the maximum is used for the third point. Therefore, a signal value or Y value that does not correspond to the absolute maximum value of the line signal, but is formed from a region around the maximum value, is used for the third point. For example, an X value range (e.g., line index range) that lies around the X value (e.g., line index) of the maximum is defined. A corresponding statistical signal value (e.g., Y value) that is assigned to the third point through which the profile function passes is then formed from the signal values in this specified lateral region (e.g., X value region).

In a specific embodiment, the specified lateral region (e.g., X value region) extends over 10 to 50% of the entire extension of the line signal (e.g., in the X-direction) or, for example, over 20 to 35% of the entire extension of the line signal. This provides that the Y value of the third point is, for example, formed from a quarter or a third of all signal values of the line signal, where this quarter or third lies around the X value of the maximum. Such a statistical signal value for the third point enables the profile function to be used very reliably for the extrapolation of the body contour.

In a further example embodiment, it is provided that the statistical value is a mean value or median value. For example, a mean value representing the Y value for the third point is formed from signal values around the maximum. It may be advantageous to use the median value, which represents the middle value of a set of signal values, instead of the mean value. This value may be used if the line signal has clear "outliers".

According to a further example embodiment, it is provided that a transition portion for slope fitting is inserted between the first point and/or the second point and a respective extrapolated portion of the profile function. The transition portion may have the same slope as the line signal at one end and/or the same slope as the profile function at an opposite other end. This provides that a transition portion is arranged between the line signal and the actual extrapolated portion. This transition portion is primarily intended to avoid kinks in the signal curve. This is achieved by fitting the slope in the transition portion to the line signal on the one hand and/or to the attached extrapolated portion on the other hand. Therefore, at the junction between the extrapolated portion and the transition portion, both may have the same slope as at the joint between the transition portion and the line signal. If the line signal is truncated at both sides, corresponding extrapolations and transition portions may be provided on both sides. The in each case adjacent curve portions may not have any kinks, but rather in each case have the same slope. This also enables artifacts in the reconstructed image signal to be reduced.

In a further example embodiment, the two transition portions are in each case formed by a linear combination of a straight line or path and an ellipse. This provides that the curve shape in the respective transition portion is made up of two weighted partial functions (e.g., straight line and ellipse). Hence, the slope of the transition portion may be fitted to the respective end of the line signal. In the case of a 40 cm wide detector, the transition portion may be a few cm. Overall, a transition region may represent about 2% to 10% of the total extension of the line signal.

In an alternative example embodiment, it is provided that the transition portion or both transition portions are in each case obtained by spline interpolation or polynomial interpolation. These types of interpolation have the advantage that the slope of the respective transition portion may be fitted at both ends. This provides that there would be no kink between the extrapolation portion and the transition portion and no kink between the transition portion and the line signal.

In a further example embodiment, a reference straight line is formed with the first point and the second point, and the maximum is ascertained by finding the point of the line signal with the greatest (e.g., perpendicular) distance from the reference straight line. In this case, therefore, it is not the baseline of the line signal (e.g., zero signal) that forms the reference straight line for ascertaining the maximum, but rather the straight line defined by the first point and the second point. This takes account of the circumstance that the truncation is asymmetrical. Especially in the case of asymmetrical truncations in relation to the longitudinal axis of the body, the absolute maximum of the line signal may be very close to one of the ends of the line signal. Using such a point for the extrapolation would be disadvantageous. The reference straight line defined by the first point and the second point may thus be used, and the X value or line index for the third point at which the line signal has the greatest distance from the reference straight line may be used.

As another example, an imaging modality for reconstructing an image of an object (e.g., body) is provided. The imaging modality includes a detection facility for capturing a line signal (e.g., 1D projection) of the object, where the line signal represents a truncated projection through a portion of the object (e.g., not the entire cross section), and a computing facility (e.g., one or more processors) for extrapolating the line signal and for reconstructing the image with the aid of the extrapolated line signal. The computing facility is configured to perform the extrapolation with a profile function representing an approximation of a cross-sectional profile of the object and select three points for the extrapolation and place the profile function into these points. The three points include: a) a first point at a first end of the line signal; b) a second point at a second end of the line signal opposite the first end or corresponding to an end of the cross-sectional profile of the object; and c) a third point having a line index (e.g., x value) that matches a maximum of the line signal.

The detection facility (e.g., a detector) may be an X-ray detector, a magnetic field sensor, an ultrasonic detector, and so on. The detection facility may at least be able to capture a single line (e.g., 1D) of a projection. In one embodiment, the detection facility is a matrix sensor with a plurality of lines (e.g., 2D).

The computing facility may have one or more processors and one or more memories. For example, an application or algorithm that may automatically extrapolate the line signal and hence reconstruct an image is implemented on the computing facility.

The advantages and developments described above in connection with the method according to the present embodiments also apply analogously to the imaging modality according to the present embodiments. Corresponding method features may represent functional features of the imaging modality.

The imaging modality may be an X-ray facility, an MRI facility, or a sonography facility (e.g., angiography system, CBCT system, C-arm system, and so on).

According to the present embodiments, a computer program that has instructions that, when executed in a processor of the imaging modality, cause the imaging modality to execute a method as described above is also provided.

For applications or situations that may arise during the method and are not explicitly described here, it may be provided that, in accordance with the method, an error message and/or prompt to input user feedback is issued, and/or a default setting and/or a predetermined initial state is set.

Independent of the grammatical term usage, individuals with male, female, or other gender identities are included within the term.

BRIEF DESCRIPTION OF THE DRAWINGS

The present invention will now be explained in more detail with reference to the accompanying drawings, which show.

DETAILED DESCRIPTION

Figure 1:
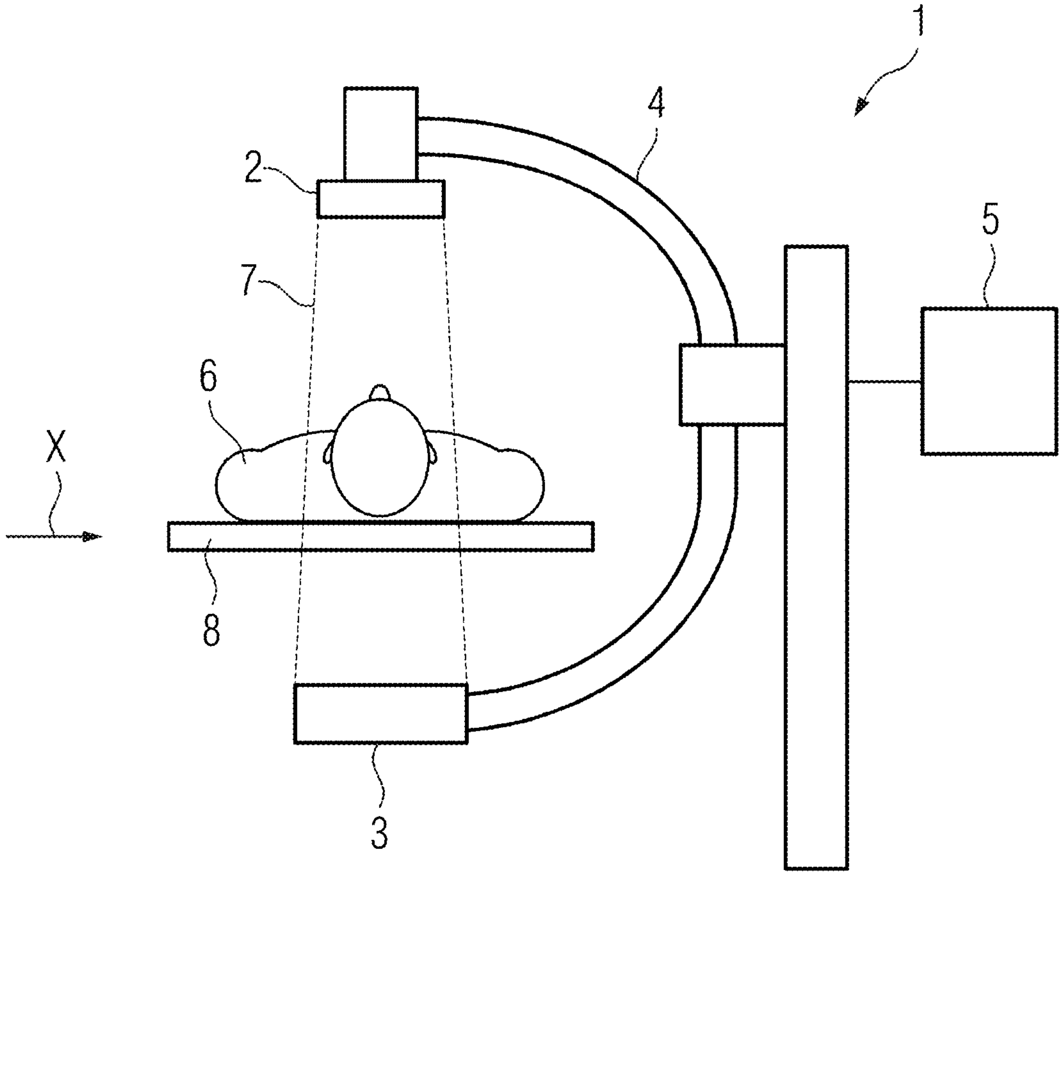
FIG. 1 is a schematic view of an imaging modality with an irradiated object.

FIG. 1 shows a schematic view of an imaging modality 1. The imaging modality 1 may be an X-ray system, an MRI system, a sonography system, or another imaging modality. In the present example, the imaging modality 1 is configured as a C-arm X-ray system. The C-arm X-ray system has an X-ray source 2 and an X-ray detector 3 located opposite the X-ray source 2. The X-ray source 2 and the X-ray detector 3 are connected to one another via a C-shaped arm 4.

The imaging modality 1 has, for example, a computing facility 5 that may be used to control the X-ray source 2, the X-ray detector 3, and the C-arm 4. Likewise, the computing facility 5 may be used to extract a line signal from the signals of the X-ray detector 3 or another detector. Further, the computing facility 5 may be used to extrapolate the line signal. The computing facility 5 may also be able to reconstruct a two-dimensional image from a plurality of line signals of the X-ray detector 3 (e.g., a detector).

An object 6 is irradiated by radiation 7 from the X-ray source or radiation source 2. For example, the object is a patient lying on a patient bench 8. Here, a longitudinal direction of the patient is arranged perpendicular to the drawing plane.

In the present example, the lateral extension (e.g., X direction) of the detector 3 is smaller than the lateral extension of the patient and/or the object 6. Therefore, the detector 3 only records a truncated line signal. Regions of the object 6 that are not captured by the radiation 7 or the detector 3 are not represented in the detector signal, so that a cut-off or truncated line signal or image results. At the capture edges, the capture signal or line signal jumps almost suddenly to zero. This jump results in artifacts in the image reconstruction (e.g., in significant increases in the gray values in the truncated edge regions). This is counteracted by the extrapolation depicted below.

Figure 2:
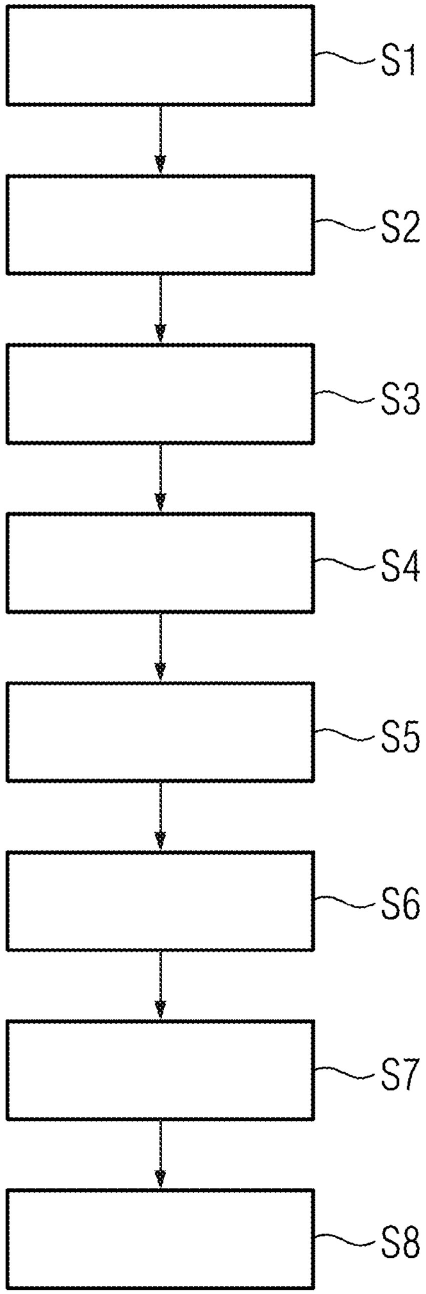
FIG. 2 is a block diagram of an example embodiment of a method.

FIG. 2 is a schematic view of a block diagram of an example embodiment of a method. The method is used to reconstruct an image of the object 6. In a first act S1, a line signal of the object 6 is captured with an imaging modality 1, where the line signal represents a truncated projection through a portion of the object 6. In practice, a thin cross-sectional slice of the object 6 is irradiated by the radiation 7, and a line of the detector 3 running in the X-direction records this projection. This result in a line signal 9 (see FIGS. 3 and 4). The line signal, or the portion representing the line signal, is truncated (e.g., cut off). This provides that the line signal does not represent a complete cross section through the object. Rather, the line signal only represents part of the cross section. Herein, the line signal 9 may be truncated at one end or at both ends.

An attempt is now made to extrapolate the truncated line signal 9. For the extrapolation, three points, through which a profile function may be placed, are sought. The profile function represents an approximation of the projection of the object onto the detector or line sensor. If, for example, an X-ray is taken of the thorax, the resulting line signal approximates a semi-ellipse. At both sides, the signal strength is zero at the very outside, while the signal strength in between corresponds to the attenuation of the radiation by the object.

In act S2, the first point 10 is selected or defined at the first end of the line signal 9. Therefore, the first point 10 corresponds, for example, to the first usable signal point of the line signal 9. In act S3, a second point 11 is selected or defined at a second end of the line signal 9 opposite the first end. Therefore, the second point 11 corresponds, for example, to the last usable signal point of the line signal 9. Alternatively, the second point may also correspond to an end of the cross-section projection at which the cross-sectional projection intersects the signal zero line.

In an optional act S4, a reference straight line 12 is placed through the first point 10 and the second point 11. It is also optionally possible to use the baseline (e.g., signal zero line) as a reference straight line.

Figure 3:
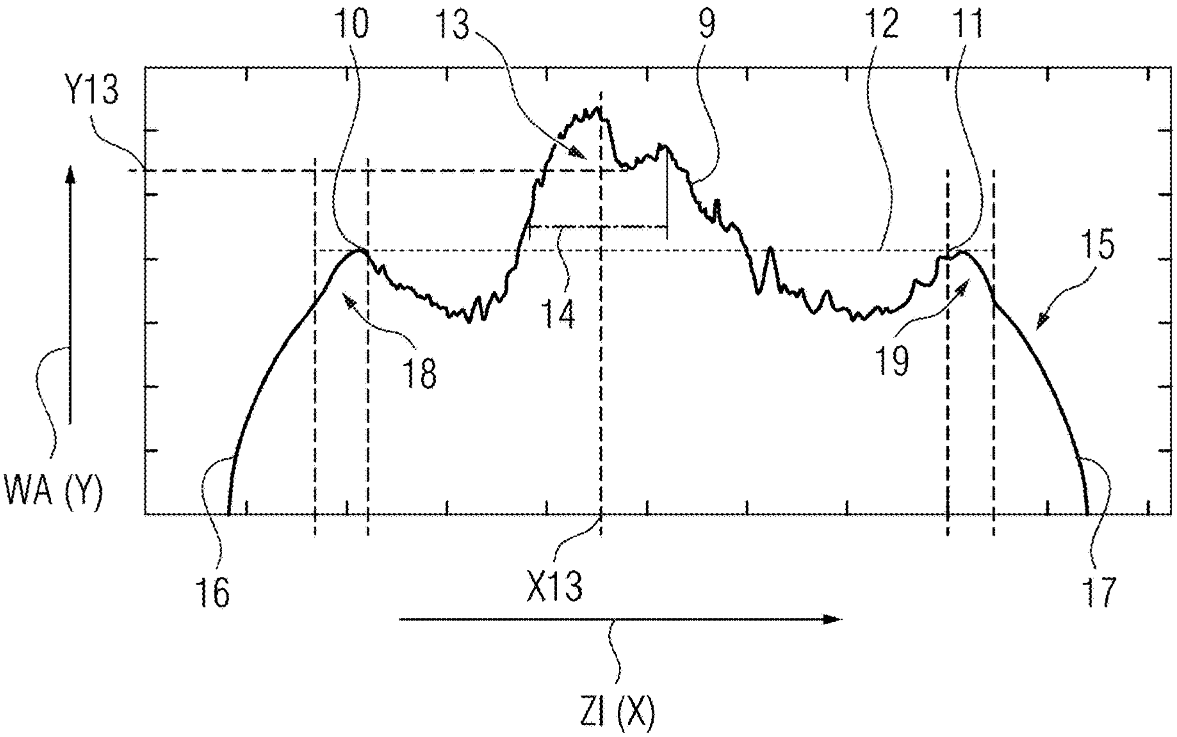
FIG. 3 shows an extrapolated symmetrically truncated line signal of a lung.
Figure 4:
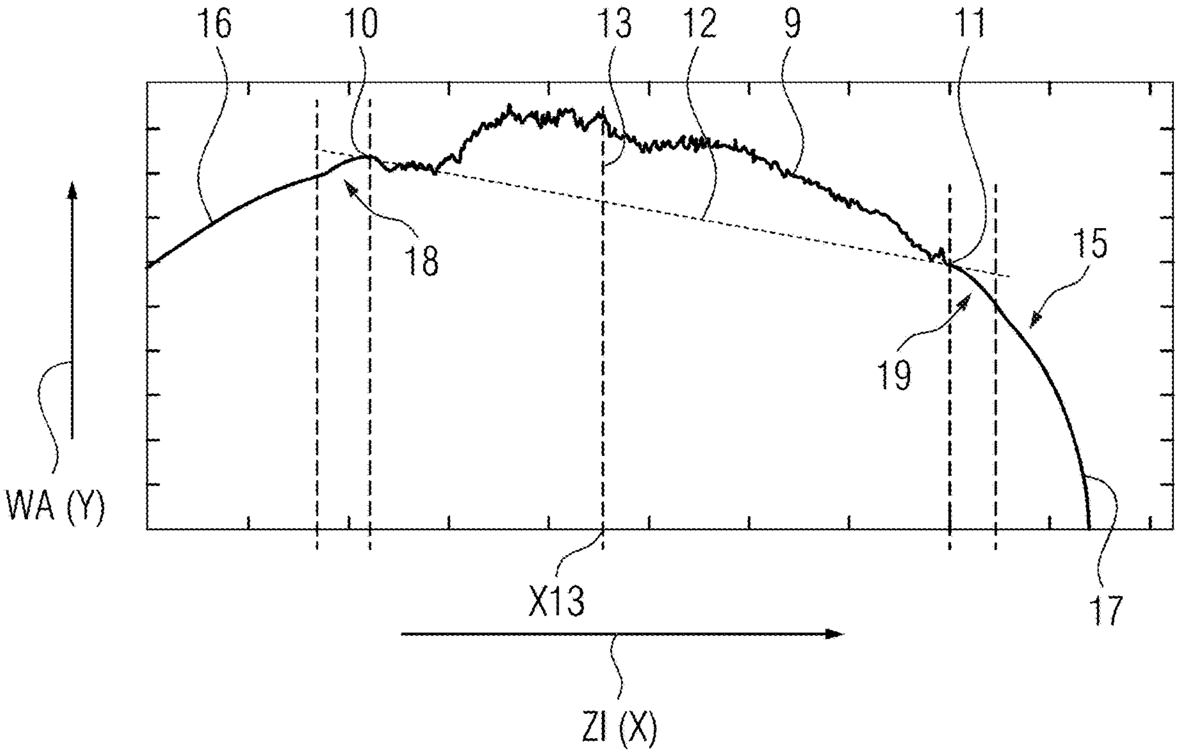
FIG. 4 shows an extrapolated asymmetrically truncated line signal of a liver.

In act S5, an X value is ascertained on the abscissa of the line signal diagram (see FIGS. 3 and 4). The X value corresponds, for example, to the line index ZI of the detector. The X value used is the value at which the associated Y value of the line signal 9 reaches a maximum. The amplitude of the line signal corresponds, for example, to a water value or water equivalent WA, which indicates which water column has the same absorption as the measurement signal.

In both FIGS. 3 and 4, a third point 13 resulting from a respective maximum is ascertained in each case. The maximum may, for example, be the absolute maximum of the line signal 9. Alternatively, the maximum may also be located where the line signal 9 has the greatest distance from the respective reference straight line 12. The latter selection of the maximum is, for example, advantageous in the case of asymmetric truncation, since there is then less risk of the maximum being at the very outside.

The third point 13 provides the corresponding X value X13 (see FIGS. 3 and 4). It now remains to be seen which Y value the third point 13 should receive. In act S6, a corresponding Y value is ascertained or defined. For example, the Y value of the third point 13 may be the signal value that actually represents the maximum. However, it is more advantageous for the Y value of the third point 13 to be formed by a statistical evaluation of the signal values around the X13 value. For example, the Y value Y13 of the third point 13 is calculated by averaging. For this purpose, for example, an interval 14 (e.g., symmetrical) around the value X13 is used. A mean value is formed from all the signal values of the line signal 9 in the interval 14. Alternatively, a median value may also be ascertained in this interval 14 (e.g., lateral region in the X direction). The extension of the interval 14 in the X direction may be a number of (e.g., several) cm (e.g., 10 cm), with a total detector width of 40 cm. The interval 14 may therefore correspond to a relative extension of 25% of the extension of the entire line signal 9. The third point 13 is completely determined with the value Y13.

In act S7, a profile function 15 is placed through the first point 10, the second point 11, and the third point 13, and beyond the first point 10 and the second point 11, a section of this profile function 15 is used for extrapolation in each case. Hence, in FIGS. 3 and 4, a first extrapolation portion 16 results in the respective representation on the left next to the first point 10, and a second extrapolation portion 16 is obtained in the respective representation on the right next to the second point 11.

Up to this point, it may be achieved that the two extrapolation portions 16 and 17 directly follow the line signal 9 at points 10 and 11. As a result, the overall signal would no longer have a jump at points 10 and 11. However, the overall curve may generally have a kink at points 10 and 11, since the slope of the line signal 9 is not fitted to the extrapolation portions 16 and 17. Therefore, it is advantageous to introduce a respective transition portion 18, 19 between the respective extrapolation portion 16, 17 and the line signal 19. These transition portions 18, 19 serve to keep a respective kink as small as possible. These transition portions 18 and 19 may, for example, be realized by a linear combination of straight lines and ellipses, by spline interpolation or the like, as demonstrated by the following concrete example.

Even though the examples in FIGS. 3 and 4 are depicted with line signals 9 extrapolated on the left and right, it is also possible for extrapolation only to take place on one side of the line signal 9. This is, for example, advisable if truncation only takes place on one side of the object.

Finally, in a last act S8, an image is reconstructed with the aid of the overall line signal, as depicted, for example, in FIGS. 3 and 4 including portions 9, 15, 16, 17, and 18. The extrapolated portions generally reduce the image artifacts during reconstruction.

Concrete example embodiments are described below.

The present embodiments focus, for example, on the targeted correction of massive truncations. The water value or the water equivalent at the truncation point or cut-off point may be 8 cm or more. A further limitation may be the size of the scan field of view in the isocenter (e.g., center of the body of the patient), which may have a diameter of at least 20 cm. Projection data that does not meet these conditions and the condition of a concave profile (see concave semi-ellipse in FIGS. 3 and 4) may be corrected using the methods described by Zellerhof et al.

1D profiles of projections of the human body onto the detector of a C-arm system may largely be approximated by a concave semi-ellipse. The truncated projection data is extrapolated by determining such a semi-ellipse from three data points. Two points 10, 11 result from the outermost left and right values of the projection data (e.g., the line signal 9). The third point 13 lies in between and is calculated in a number of (e.g., several) acts. First, a line or reference straight line 12 connecting the two outer points 10, 11 to one another is determined. In the next act, the distance between this line 12 and all projection data (e.g., line signal 9) lying thereabove is calculated. If there are no points above the line 12, no ellipse may be calculated, and the method for extrapolation described by Zellerhof et al may be used. In a third may, the point 13 with the maximum distance is selected. The detector line index of this maximum determines the detector line index of the third point 13 for the semi-ellipse. The water value of the third point 13 is determined by averaging the projection data in the radius (e.g., interval 14) of a few cm around this maximum.

A gradual transition between projection data (e.g., line signal 9) and ellipse (e.g., profile function 15) is achieved by fitting a line to the outermost few cm of the truncated data and the first few cm of the extrapolation by a linear combination of a straight line and ellipse (e.g., transition region).

The examples of projection data in FIG. 3 represent a projection data profile of the human lung. The lungs show correspondingly reduced absorption. FIG. 4 shows an example of an asymmetrically truncated liver.

In the present concrete example, a semi-ellipse is used for the extrapolation. The basic equation for the semi-ellipse is:

$$\frac{(x-x_0)^2}{a^2}+\frac{y^2}{b^2}=1$$

Herein, $x_0$ denotes the position of the ellipse center on the horizontal axis (e.g., main axis), x denotes the line index of the detector, and y denotes the water value or signal value. Substituting the three points $(x_1, y_1)$, $(x_2, y_2)$, $(x_3, y_3)$ and introducing auxiliary terms results in:

$$\text{term}_1=(y_2^2-y_1^2),\ \text{term}_2=(y_3^2-y_2^2),\ \text{term}_3=(y_1^2-y_3^2)$$

$$x_0=\frac{(x_3^2*\text{term}_1+x_1^2*\text{term}_2+x_2^2*\text{term}_3)}{2*(x_3*\text{term}_1+x_1*\text{term}_2+x_2*\text{term}_3)}$$

$$\text{term}_4=(x_1-x_0),\ \text{term}_5=(x_2-x_0)$$

$$a=\sqrt{\frac{\text{term}_4^2*y_2^2-\text{term}_5^2*y_1^2}{y_2^2-y_1^2}}$$

-continued $$b=\sqrt{\frac{\text{term}_4^2*y_2^2-\text{term}_5^2*y_1^2}{\text{term}_4^2-\text{term}_5^2}}$$

The radicands of the equations for a and b is to be positive so that a concave shape of the ellipse in real space is defined. In addition, empirical safety conditions are added for the minimum and maximum values of a with respect to b (e.g., these roughly reflect the usual anatomical conditions).

The method presented is completely analytical and does not require optimization. In addition, no knowledge of previous data is required, and the method may be easily combined, for example, with the extrapolation methods presented by Zellerhof et al. Using the mean value in a small range around the value with maximum distance to the reference straight line 12 between the outer points 10 and 11 is an appropriate solution to the challenges described by Starman et al. in fitting an ellipse to the thorax region.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for reconstructing an image of an object, the method comprising:

capturing a line signal of the object with an imaging modality, wherein the line signal represents a truncated projection through a portion of the object;

extrapolating the line signal, wherein the extrapolating is carried out with a profile function that represents an approximation of a cross-sectional profile of the object; and reconstructing the image with aid of the extrapolated line signal; and selecting three points into which the profile function is placed for the extrapolating, the three points comprising:

a first point at a first end of the line signal;

a second point at a second end of the line signal opposite the first end or corresponding to an end of the cross-sectional profile of the object; and a third point having a line index that matches a line index of a maximum of the line signal.

2. The method of claim 1, wherein the imaging modality has an X-ray facility or a sonography facility.

3. The method of claim 2, wherein the X-ray facility is a C-arm system.

4. The method of claim 1, wherein the profile function is an ellipse.

5. The method of claim 4, wherein half of the ellipse is used for the profile function.

6. The method of claim 4, wherein a main axis of the ellipse matches a baseline of the line signal.

7. The method of claim 1, wherein a signal value is used for the third point, the signal value being formed as a statistical value from signal values of the line signal in a specified lateral range around the maximum.

8. The method of claim 7, wherein the specified lateral range extends over 10 to 50% of an entire extension of the line signal.

9. The method of claim 8, wherein the specified lateral range extends over 20 to 35% of the entire extension of the line signal.

10. The method of claim 7, wherein the statistical value is a mean value or a median value.

11. The method of claim 1, wherein a transition portion for slope fitting is inserted between the first point, the second point, or the first point and the second point, and a respective extrapolated portion of the profile function.

12. The method of claim 11, wherein the transition portion or both transition portions are in each case obtained by a linear combination of a straight line and an ellipse.

13. The method of claim 11, wherein the transition portion or both transition portions are in each case obtained by spline interpolation or polynomial interpolation.

14. The method of claim 1, wherein a reference straight line is formed with the first point and the second point, and wherein the maximum is ascertained with a point of the line signal with a greatest distance from the reference straight line.

15. An imaging modality for reconstructing an image of an object, the imaging modality comprising:

a detection facility configured to capture a line signal of the object, wherein the line signal represents a truncated projection through a portion of the object; and a computing facility configured to:

extrapolate the line signal, wherein the extrapolation comprises extrapolation with a profile function representing an approximation of a cross-sectional profile of the object;

reconstruct the image with aid of the extrapolated line signal; and select three points for the extrapolation and place the profile function into the three points, the three points comprising:

a first point at a first end of the line signal;

a second point at a second end of the line signal opposite the first end or corresponding to an end of the cross-sectional profile of the object; and a third point having a line index that matches a line index of a maximum of the line signal.

16. In a non-transitory computer-readable storage medium that stores instructions executable by a processor of an imaging modality for reconstructing an image of an object, the instructions comprising:

capturing a line signal of the object with an imaging modality, wherein the line signal represents a truncated projection through a portion of the object;

extrapolating the line signal, wherein the extrapolating is carried out with a profile function that represents an approximation of a cross-sectional profile of the object; and reconstructing the image with aid of the extrapolated line signal; and selecting three points into which the profile function is placed for the extrapolating, the three points comprising:

a first point at a first end of the line signal;

a second point at a second end of the line signal opposite the first end or corresponding to an end of the cross-sectional profile of the object; and a third point having a line index that matches a line index of a maximum of the line signal.

17. The non-transitory computer-readable storage medium of claim 16, wherein the profile function is an ellipse.

18. The non-transitory computer-readable storage medium of claim 17, wherein half of the ellipse is used for the profile function.

19. The non-transitory computer-readable storage medium of claim 17, wherein a main axis of the ellipse matches a baseline of the line signal.

* * * * *